March 17, 1964 J. E. P. VERNEAUX ETAL 3,125,059
ARTICULATED BOAT TRAIN AND COUPLING TENDING TO
RE-ALIGN THE LATTER AUTOMATICALLY
Filed Oct. 19, 1960 3 Sheets-Sheet 1
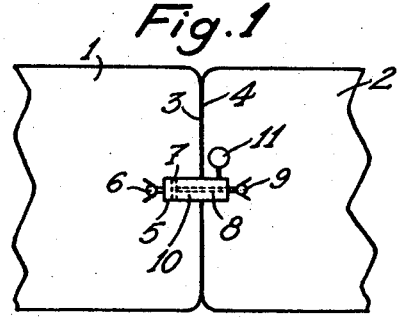
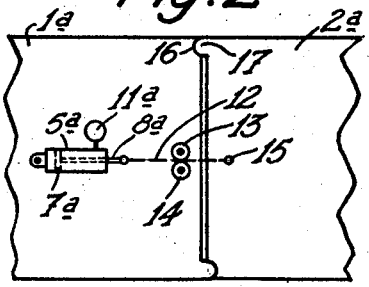
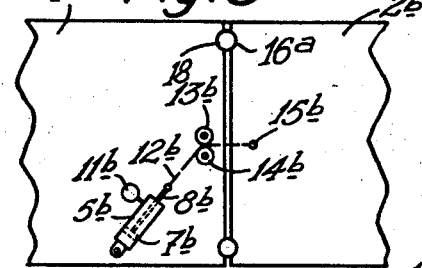
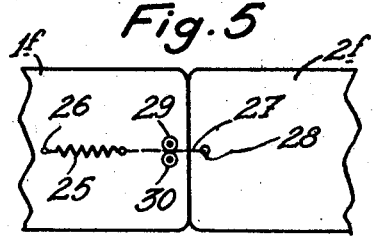
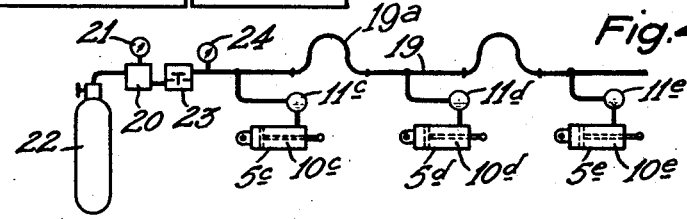
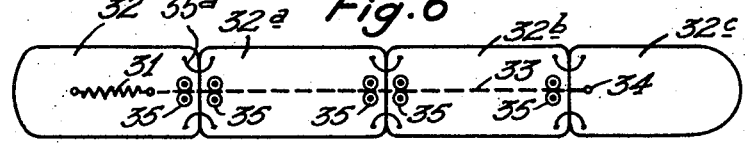
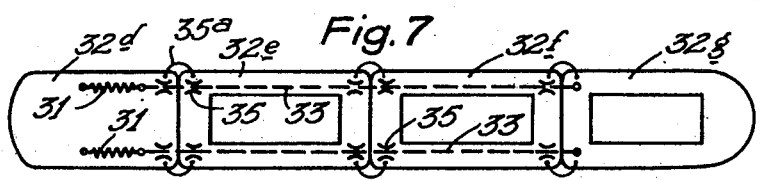
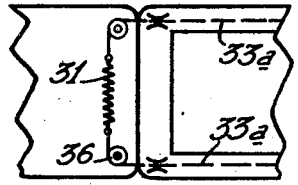

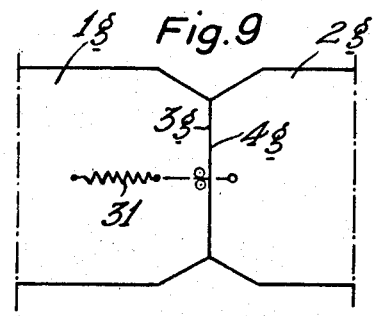
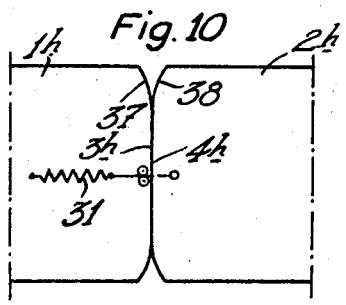
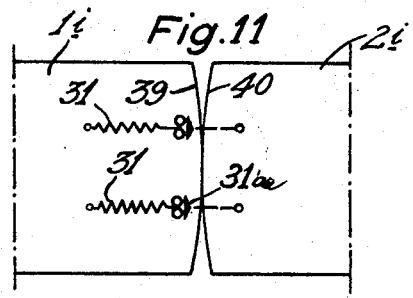
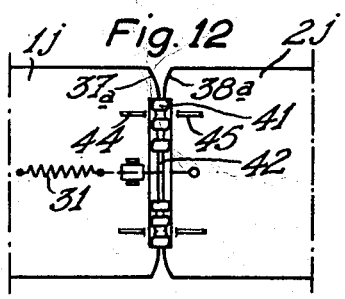
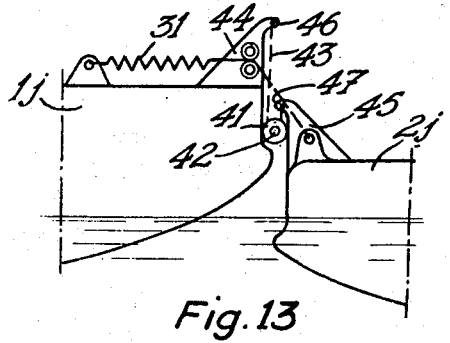
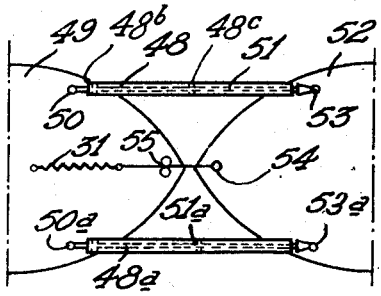
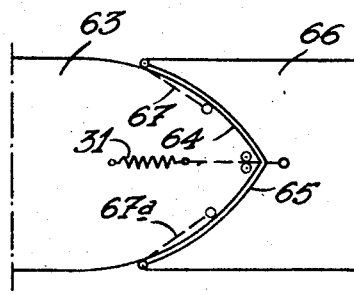

United States Patent Office 3,125,059
Patented Mar. 17, 1964

3,125,059
ARTICULATED BOAT TRAIN AND COUPLING TENDING TO RE-ALIGN THE LATTER AUTOMATICALLY
Jean Eugène Paul Verneaux, 11 Rue Cernuschi, and Adolf Cornélis Melchior, 106 Ave. de Suffren, both of Paris, France, assignors of eighty-four percent to Société Anonyme des Chantiers Navals Franco-Belges, Villeneuve-la-Garenne, France
Filed Oct. 19, 1960, Ser. No. 63,645
Claims priority, application France Oct. 22, 1959
25 Claims. (Cl. 114—235)

The present invention relates to trains made up of boats of all types (sea-going, fluvial, or those moving through a homogeneous fluid) which are propelled by the boat either at the front or at the rear of the train. The separate boats of the train are coupled to one another and it is desired that their alignment be automatically re-established after the alignment has been disturbed, as for example, when the train negotiates a curve or is subjected to some deviating force.

Towed boat-trains used at present extend great lengths and also require a rudder and a crew for each boat.

The pushed type of boat trains currently used are generally rigid, which restricts their utilization possibilities both in waters in which a swell runs and in sinuous waterways.

The reason for this is that the members such as the cables and chains generally used to rigidly interconnect the boats forming the train have insufficient flexibility to allow one boat to carry out wide sweeping movements relative to an adjoining boat without danger of such coupling member being ruptured. Furthermore, such a train cannot round curves of small radius in navigable waterways without danger of fouling the bank and hampering passage of other boats.

A number of pushed-type, deformable trains have been developed, but these do not include means to provide for their automatic re-alignment subsequent to deformation.

A coupling system between two successive boats of a pushed, articulated train is known in which the thrusting power itself produces the desired automatic realignment, and in which there is provided an amplifying device for furnishing a righting torque of adequate magnitude which increases as the angle between successive boats increases.

The present invention has for a main object the provision of a propelled train of boats comprising articulated coupling means interconnecting the successive boats of the train, and having means generating, as soon as said boats are misaligned, a righting torque which is adjustable and variable with the resulting misalignment, in order to automatically re-align said successive boats after the deviating forces generating said misalignment are removed, said train being equipped with two rudder assemblies respectively secured at the front end of the leading boat and at rear end of the rear boat of the train. In this way the alignment of the boats of the train is maintained by acting on one of said rudder assemblies in the usual way while said train may be curved by deviating the front rudder assembly in the same direction as, and the rear rudder assembly in the reverse direction with respect to, the direction normally used for a single boat negotiating a curve having the same curvature with a view to respectively apply forces directed toward the center of curvature at the front end of the leading boat and at the rear end of the rear boat of the train.

The invention allows, on the one hand, achieving a shorter train for a given number of boats and, on the other, dispensing with the individual rudders and the crew needed to man them, while at the same time conferring upon each boat the faculty of being able to move freely in relation to the adjacent boats, yet subordinating it to the latter directionally.

Another object of the invention is to provide a train of the character described having a coupling between boats which tends to automatically re-align the train. Such a coupling comprises two assemblies each one of which is formed by one or several identical members for pivotally connecting said boats about at least two perpendicular axes, said assemblies respectively working under the action of tension and compressive forces, one of said assemblies being substantially inelastic, while the other, which is resilient and adjustably pre-stressed, has a stroke sufficiently long and a resilient action sufficiently weak to allow the train to be intentionally curved by operation of its rudder assemblies, or to allow the boats of the train to be momentarily thrown out of alignment under the effect of relatively great deviating forces such as a swell. The pre-stressing forces applied to a resilient assembly working under the action of tension forces and mounted in a towed train and to a resilient assembly working under the action of compressive forces and mounted in a pushed train are respectively greater than the propulsive forces transmitted by the corresponding couplings.

Each of the two assemblies forming the combination described lends itself to several different embodiments.

The substantially inelastic assemblies which work under the action of tractive forces may be constituted, for example, by cables or chains, or else by beams or connecting-rods of fixed length in combination with swivel-joints, cables, chains, etc.

As regards the substantially inelastic assemblies which work under the action of compressive forces, they may be constituted for example by beams or connecting-rods of fixed or variable length, employed in conjunction with swivel-joints, cables, chains, etc., or may even consist of direct contact between the boats concerned, in which case, the latter may be appropriately contoured if necessary.

With regard to the resilient devices which work under the action of tension forces and which possess long travel, although these may consist in a long-stroke mechanical spring of the tension or compression type, it is nonetheless preferable to use a pneumatic buffer similar in construction to a pneumatic or hydro-pneumatic jack. This pneumatic buffer may either be of the uncontrolled type and not consume compressed air at all, or only the amount needed to make up losses sustained through leaks, or be connected via a line to a source of compressed air so as to allow voluntarily increasing or reducing the quantity of fluid, air or oil, contained in the buffer with a view to increasing or reducing the coefficient of elasticity of the assembly in order to render it proportional to the characteristics of the train, which may be a light or loaded one, and in order also to match it to outside conditions, namely the radius of bends, the heaviness of the swell which is running, etc.

The propulsion means for the train is provided by any method well-known per se, one or more propellers, paddle-wheels, etc. being examples in the case of boats.

In the interests of simplifying the description, the assemblies working under tension and compressive forces will be referred to respectively as "tensioned assemblies" and "compressed assemblies"; deformable trains achieved through application of these assemblies will be termed "articulated trains" in order to distinguish them from deformable trains known at present.

The description which follows with reference to the accompanying drawings given by way of example only and not in a limiting sense will give a clear understanding of how the invention may be performed. In the drawings:

FIGS. 1–3 are diagrammatic views, showing three different assembly methods, of a coupling equipment with a tensioned fluid-operated resilient return device having long-stroke, for use between two boats of an articulated train which bear against each other through the medium of their flat ends.

FIG. 4 is a diagrammatic view of a supply system for the tensioned fluid-operated resilient return devices having long-stroke, as shown in FIGS. 1–3.

FIG. 5 is an alternative of FIG. 2, in which the tensioned long-stroke resilient return device is constituted by a spring.

FIG. 6 is a diagrammatic view of an articulated train, in which all the couplings are controlled by a single tensioned long-stroke resilient return device placed over the longitudinal symmetry plane of the train.

FIG. 7 is a diagrammatic view of an articulated train in which all the couplings are controlled by two tensioned long-stroke resilient return members positioned laterally.

FIG. 8 shows an alternative of FIG. 7, in which the two cables or chains placed laterally are connected by a single tensioned long-stroke resilient return device.

FIGS. 9 and 10 show two alternatives of FIG. 1, in which the boats bear against each other via a fraction of the width of their ends, the latter having their corners chamfered in the case of FIG. 9 and rounded into the form of cams in the case of FIG. 10.

FIG. 11 is an alternative of FIG. 1, in which the boats bear against each other via a single point along their respective ends, the latter being cam-shaped over their whole breadth, the coupling itself comprising two tensioned long-stroke resilient return members arranged one on each side of the longitudinal plane of symmetry of the train.

FIG. 12 is a diagramamtic view of a coupling between two boats of an articulated train, said coupling comprising rollers rotating about a suspended horizontal shaft and arranged between the flat ends of two train elements and a tensioned long-stroke resilient return device.

FIG. 13 is a lateral view in partial cross-section of FIG. 12 showing the vertical displacements permissible between two boats either as the result of a running swell or of their different conditions of loading.

FIG. 14 is a diagrammatic view of a coupling between two boats in an articulated train, comprising two compressed telescopic members devoid of resiliency and a tensioned long-stroke resilient return device.

FIG. 15 is a diagrammatic view of a coupling between two boats in an articulated train, comprising, by way of a compressed device devoid of resiliency, two appendices forming part of the front boat, surrounding the rear boat and connected thereto by two cables or chains, as well as a tensioned long-stroke resilient return device.

Figure 16:
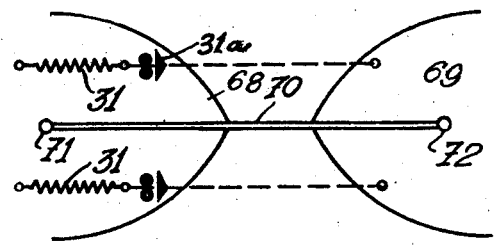

FIG. 16. is a diagrammatic view of a coupling between two boats in an articulated train, comprising two tensioned long-stroke resilient return members and a compressed connecting-rod devoid of resiliency and articulated on the two boats by means of swivel-joints.

Figure 17:
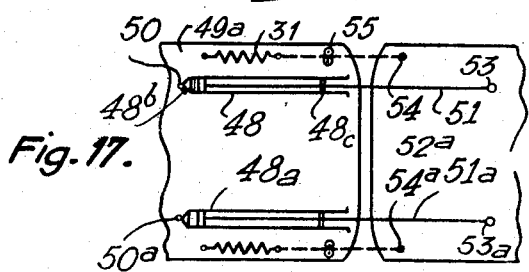

FIG. 17 is a diagrammatic view of a coupling between two boats in an articulated train, comprising, on either side of the longitudinal plane of symmetry of the train, a tensioned long-stroke resilient return member and a compressed member devoid of resiliency.

Figure 18:
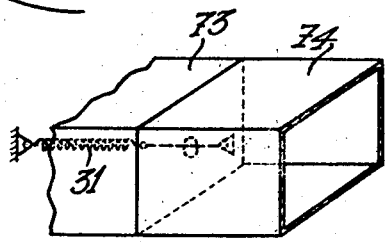

FIG. 18 is a diagrammatic view of a coupling between two elements of a train articulated in two planes and designed to move through a homogeneous fluid, said two elements bearing against each other through the medium of one of the compressed devices devoid of resiliency diagrammatically illustrated in the preceding figures but suitably modified for two-demensional operation and comprising a tensioned long-stroke resilient return device located at the center of the compressed device.

Figure 19:
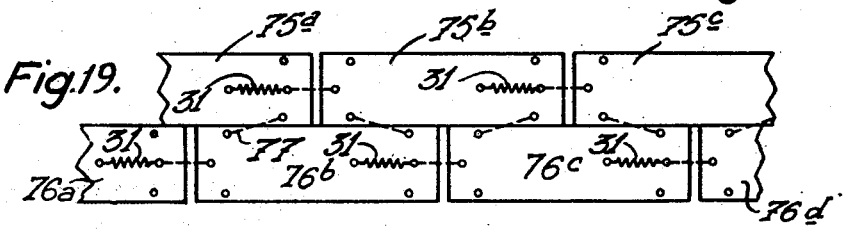
Figure 20:
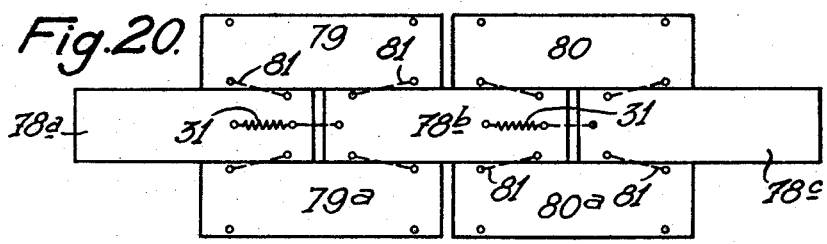

FIGS. 19 and 20 are diagrammatic illustrations of an articulated boat train consisting of two or three parallel lines of boats placed side by side in staggered fashion and connected together longitudinally by tensioned long-stroke resilient return devices and compressed devices devoid of resiliency.

Figure 21:
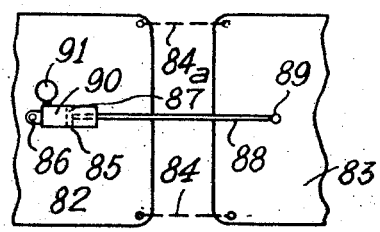

FIG. 21 is a diagrammatic view of a coupling between two boats in an articulated train, comprising a compressed long-stroke resilient return device and two tensioned members devoid of resiliency.

Figure 22:
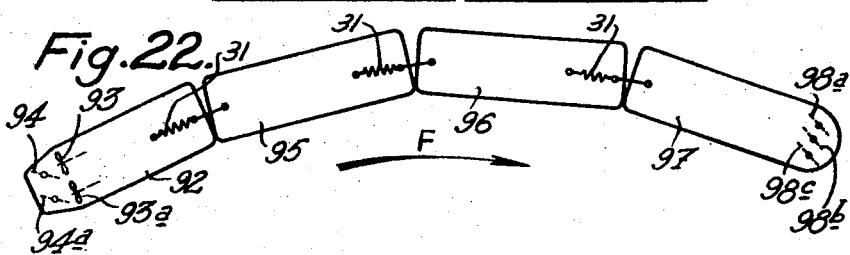

FIG. 22 shows a full train complete with its propulsion and gyration devices, the elements of which are interconnected by means of one of the coupling devices in FIGS. 1–21, the train negotiating a curve.

In the various figures the train will be considered as moving in the direction of arrow F in FIG. 22.

In the embodiment shown in FIG. 1, the boats 1 and 2 are held against each other, at their flat ends 3 and 4 which together form a compressed inelastic connecting device, by a tensioned connecting device of the long-stroke, resilient return type consisting of a pneumatic or hydro-pneumatic buffer which comprises a cylinder 5 astride the two boats 1 and 2. The cylinder 5 is fixed by a swivel-joint 5 to the boat 1 and within said cylinder travels a piston 7 the rod 8 of which is fixed to the boat 2 by means of a swivel-joint 9. The chamber 10 of this cylinder in which travels the rod 8 is filled with compressed air or with some liquid such as oil and communicates with a further chamber 11 containing an adjustable quantity of compressed air the purpose of which is to prestress the tensioned device and to make possible modifications to the working characteristics of the coupling in accordance with requirements.

The compressed air admitted initially into chamber 11 and subsequently into chamber 10 is at a pressure such as to press the two boats 1 and 2 against each other with an initial force sufficient to impart to the train the initial tauntness needed to maintain contact between the boats in the train when the latter is stopped or when, as is the case with pushed trains, the propulsion means operates at the rear of the train. In the case of towed trains, the prestressing force exerted by the compressed air is adjusted to a value greater than the propulsive force applied to the train, so as to maintain a degree of tautness in the train sufficient to preclude separation of the boats.

When the train is navigating in a running swell or when it is made to curve toward starboard for instance, the two boats lean on each other by their corners disposed on their starboard sides while their flat ends diverge from each other, thus removing from each other the fixing points 6 and 9 of the resilient return device formed by piston 7 and cylinder 5. Due to said removal, the rod 8 of piston 7 extends from the cylinder 5 and, in so doing, still further compresses the air initially trapped in the chamber 11 and possibly in the chamber 10. Compression of this air increases the tension force which draws the boats towards one another, and hence also increases the righting torque, this in turn resulting in the train being re-aligned as soon as the perturbing forces, swell or curving forces, cease to act. Simultaneously the elasticity of said gas generates a reverse reaction tending to push back the piston 7 towards the bottom of cylinder 5 and to bring nearer the points 6 and 9. Therefore the hulls of the boats are submitted to a compressive force at their contacting corners while a tractive force is exerted from point 9 towards point 6.

The initial pressure of the compressed air is chosen so that if at the start any involuntary deformation of the aligned train takes place as the result of weak perturbing forces the resulting compression of said air generates a righting torque which is adequate to ensure suitable tautness of the train.

The layout shown in FIG. 2 differs from that in FIG. 1 only in that the pneumatic buffer-type member 5a, which acts as a tensioned resilient connecting device is mounted in its entirety on the boat 1a, has its rod 8a of the piston 7a coupled to a chain or cable 12 running over guide-pulleys 13 and 14 carried by the boat 1a, the chain or cable 12 then being anchored at 15 on the boat 2a.

Furthermore, the ends of the boats acting as a compressed inelastic device are specially designed to facilitate relative rotation of the one with respect to the other without lateral slip, this being achieved by means of notches 16 which accommodate tongues 17.

The layout shown in FIG. 3 differs from that in FIG. 2 only in that the pneumatic buffer-type member 5b acting as a tensioned resilient connecting device is placed obliquely, instead of parallel to the longitudinal plane of symmetry of the boat 1b. The other elements of this assembly have the same reference numerals as those used in FIG. 2 but are followed by the numeral b. In this layout, in order to facilitate relative rotation between the boats without any danger of slipping, use is made, inside notches 16a formed in both boats, of members 18 which are independent of the boats, and which may be vertical rollers made of material such as natural or synthetic rubber. These rollers are secured to one of the boats by means known to a man skilled in the art such as ropes, chains or the like at the ends of which are respectively suspended the rollers 18 in a manner similar to that used for the mounting of buffers used for protecting the hull of a boat during mooring.

In the embodiments of FIGS. 2 and 3, when negotiating a curve toward starboard the same results are obtained as in the case of FIG. 1, the boats leaning on each other by the starboard tongue 17 and notch 16 (FIG. 2) or the starboard member 18 (FIG. 3) while the cable 12 or 12b is submitted to a tractive force.

In the embodiment shown in FIG. 4, the tensioned long-stroke resilient return devices or tensioned resilient connecting devices 5c, 5d, . . . , each comprising its working chamber 10c, 10d, . . . connected to its auxiliary chamber 11c, 11d, . . . , are connected, through a common conduit 19 equipped with flexible pipes 19a between each successive pair of elements in the train, to an adjustable pressure-relief valve 20 incorporating a pressure gage 21 connected to a source of compressed air 22 such as an air bottle. Into the conduit 19 is inserted a non-return valve 23 and a pressure gage 24 which, if required, may be associated to non-return valves and two pressure gages of similar type on each branch line.

By acting upon the pressure-relief valve 20, it is possible to adjust the pressure of the air introduced simultaneously into the pneumatic buffer-type member of all the couplings in the train.

In this way, it is possible to adapt the magnitude of the pre-stressing force to suit the type of propulsion used, and that of the righting torques in all the couplings to suit the forces acting upon the articulated train, these latter forces varying constantly in the course of operation, according to the number of boats in the train, their condition of loading, the absolute speed of the train according to whether the latter is travelling with or against the current, and according to the strength of the swell which is running.

Moreover, it is possible to differentiate between the righting torques, from one coupling to another, by acting individually upon the volume and the pressure of air in the auxiliary chambers 11c, 11d . . . , in order to adapt each to variations in the flexural movements acting at right angles to the couplings when the train is being curved.

FIG. 5 shows a layout similar to that in FIG. 1, but in which, instead of being constituted by a pneumatic buffer, the tensioned long-stroke resilient return and connecting device is constituted by a pre-stressed, long-stroke mechanical spring 25 which is fixed to the boat 1f at 26 and connected to a chain or cable 27 which is itself fixed to the boat 2f at 28 after running over guide pulleys 29 and 30 carried by the boat 1f.

When negotiating a curve toward starboard the two boats lean on each other by their corners disposed on their starboard side while the flat ends diverge from each other which removes point 28 from point 26. The cable 27 pulls more the spring 25 the reaction of which exerts a supplementary tractive effort on point 28 towards point 26. Therefore the hulls are submitted to a compressive force at their contacting corners and a tractive force acts on spring 25 and cable 27.

In order to simplify the drawings and the description, the tensioned long-stroke resilient return device in the figures which follow will be shown in the form of the one in FIG. 5 and will have the reference numeral 31.

In the embodiment shown in FIG. 6, a tensioned long-stroke resilient return device 31, fixed to one of the end boats 32 of the articulated train and located in the longitudinal plane of symmetry thereof, produces the righting torque for the various couplings in the train by means of a cable, a chain or a tie-rod 33 extending from the rear coupling to the front coupling. Connecting means 33 is fixed to the other end boat 32c at 34 and is guided over the intermediate boats 32, 32a and 32b by rollers or guides 35, while chains 35a restrict the angles which may be formed between boats. This type of layout is particularly suitable for flat-topped boats.

When negotiating a curve the effects between each pair of successive boats such as 32, 32a are similar to those obtained in the embodiment of FIG. 5.

The embodiment shown in FIG. 7 differs from that in FIG. 6 only in that the tensioned device comprises two long-stroke resilient return members 31, together with the cables, chains or tie-rods 33 and their guides 35, placed to port and to starboard, symmetrically in relation to the longitudinal plane of symmetry of the articulated train formed of boats 32d to 32g.

When negotiating a curve toward starboard for each pair of successive boats such as 32d and 32e the effects are similar to those obtained in the embodiment of FIG. 5, the cable 33 and spring 31 disposed on the port side being submitted to a tractive force while those disposed on the starboard side remain inoperative.

The embodiment in FIG. 8 differs from that in FIG. 7 only in that the cables, chains or tie-rods 33a along each side have their rear ends interconnected by means of a single tensioned long-stroke resilient return device 31 after they have passed over guides or rollers 36. When negotiating a curve toward starboard the starboard end of spring 31 remains stationary, said spring and the cable 33a disposed on the port side being submitted to a tractive effort while the hulls of the boats are submitted to a compressive force at their starboard corners in contacting engagement. The layouts in FIGS. 7 and 8 are particularly suited for articulated trains consisting of boats with open holds. In FIGS. 6 to 8 the contacting ends of the boats act as compressed inelastic devices while members 31 act as tensioned resilient devices.

The embodiment in FIG. 9 differs from that in FIGS. 1 and 2 only in that the boat ends 3g and 4g, which bear against each other as a compressed inelastic device under the effect of the tensioned long-stroke resilient return and connecting device 31 are narrower in width than those of boats 1g and 2g. This operates as the one illustrated in FIG. 5.

As shown in FIG. 10, the end faces of boats 1h and 2h which act as a compressed inelastic device embody central flat portions 3h and 4h which terminate in cam-shaped rounded portions 37 and 38. In this way, the thrust point between the two boats moves away from the longitudinal plane of symmetry of the train as the angle formed between the longitudinal planes of symmetry of the two adjacent boats 1h and 2h increases. Contact is maintained by means of the tensioned long-stroke resilient return and connecting device 31.

When negotiating a curve the operation is the same as in the case of FIG. 5 except that the leaning points of the boats move on the surfaces 37 and 38.

In the embodiment shown in FIG. 11, the end faces 39 and 40 of boats 1i and 2i which act as a compressed inelastic device are cam contoured over their whole width, so that the thrusting action between the boats, even when the train is straight, is always applied through a single line which shifts from the longitudinal plane of symmetry to the side, as the angle formed between the longitudinal planes of symmetry of two successive boats increases. Contact between the boats is maintained by means of two tensioned long-stroke resilient return members or resilient connecting devices 31 whose distance from the longitudinal plane of symmetry is such as to ensure the initial tautness needed to permit normal navigation without involuntary deformations taking place under the action of small perturbing forces. Once the distances between their attachment points on the boats become less than its initial value as the result of the stops 31a, these members 31 no longer act as tensioned devices.

When negotiating a curve toward starboard the starboard stop 31a operates so that the starboard cable becomes slack and the port device 31 acts as in the case of FIG. 5.

This system, like those in FIGS. 1, 2, 3, 5, 9 and 10 in which there is direct contact between the end faces, is more particularly suited to articulated trains consisting of boats of generally rectangular shape which have been specially built for this type of navigation and which operate on waterways with only a slight swell running.

In the embodiment shown in FIGS. 12 and 13, there are interposed, between the end faces of boats 1j and 2j which act as a compressed inelastic assembly, rollers 41 mounted for rotation about a common horizontal axle 42 suspended by chains or cables 43 from supports 44 and 45 which terminate in extensions 46 and 47. When the train is rectilinear, the rollers 41 transmit the compressing force exerted by the tensioned long-stroke resilient return and connecting device 31, plus the pushing- or minus the towing-force applied to the train. During curving operations, these forces are transmitted directly by the extremities 37a and 38a of the end faces. This system is more particularly suited to the types of trains specified hereinbefore but which are called upon to operate on waterways subject to heavier swells.

When negotiating a curve the embodiment of FIGS. 12 and 13 operates as the one illustrated in FIG. 5.

Instead of transmitting the compressing force generated by the tensioned device, diminished or increased by the propulsive force, by thrusting action between the end faces of successive boats in a train which act as a compressed device without elasticity as shown in FIGS. 1, 2, 3, 5 and 9 to 13, use is made in FIG. 14 of two lateral telescopic rods acting as a compressed device without elasticity or a compressed inelastic connecting device and comprising tubular parts 48 and 48a fixed to the boat 49 by swivel-joints 50 and 50a. In these tubular parts slide, between the stops 48b and 48c, parts 51 and 51a fixed to the boat 52 by swivel-joints 53 and 53a. These rods may be equipped, if necessary, with shock-absorbers which give way to towing or pushing forces greater than the compression force exerted by the tensioned long-stroke resilient return and connecting device, diminished by the pull or increased by the thrust provided by the propulsion means.

When negotiating a curve toward starboard, the telescopic rod 48a, 51a is submitted to a compressive force as the member 18 of FIG. 3 and the telescopic rod 48, 51 extends while remaining inoperative. The device 31 operates as in FIG. 5. However, said telescopic rods being fixed to the boats by means of the swivel-joints 50, 53, 50a, 53a it is necessary for the stability of the system that the distance between the points of fixation of the device 31 to the boats remains smaller than that between the swivel-joints of the compressed telescopic rod 48a, 51a.

In addition to acting as a compressing device, the tensioned long-stroke resilient return device 31 of FIG. 14 acts as a centering member for boats 49 and 52 relative to each other, by virtue of the fact that the distance between the attachment and guidance points 54 and 55 of this device is smaller than that between the swivel-joints 50, 53 and 50a, 53a used to anchor the telescopic rods.

This system is more particularly suited to articulated trains made up of boats the ends of which are pointed or rounded, and also to trains called upon to navigate in waters in which there is a swell running.

In the embodiment shown in FIG. 15, one of the boats 63 terminates in a pointed or rounded end 64 which is accommodated in the concave end 65 of the other boat 66. The extremities of this concave shape are connected to the boat 63 by chains or cables 67 and 67a, the whole forming a compressed inelastic connecting device. The boats are pressed against each other by a tensioned long-stroke resilient return and connecting device 31. This layout is particularly suited to articulated trains made up of a rear boat having a pointed nose and pushing another boat in front of it.

When negotiating a curve toward starboard cable 67a is tensioned, the rotation being executed around its fixing point on boat 63 until the corner of boat 66 at which said cable 67a is attached contacts said boat 63 during its rotation around said fixing point. From this moment the rotation continues around said corner which remains stationary. During this movement the other corner of boat 66 to which cable 67 is attached comes nearer to the fixing point of said cable 67 on boat 63 and said cable 67 becomes slack. The situation is then exactly the same as in the case of FIG. 5.

The coupling between two boats 68 and 69, shown in FIG. 16, comprises a rigid rod 70 fixed to these two boats by swivel-joints 71 and 72 respectively, the rod 70 acting as a compressed inelastic connecting device. The boats are pulled back towards each other by two tensioned long-stroke resilient return and connecting members 31 placed one on each side of the rod 70. In order to prevent the coupling from oscillating in response to weak external forces, the device 31 is arranged so that it no longer exerts tension as soon as the distance between their attachment points on the boats becomes less than its initial value, this being achieved by means of stops 31a.

During the negotiation of a curve toward starboard the boats lean on each other by means of rod 70 which is compressed. Due to its stop 31a the starboard cable becomes slack while the port device 31 and its cable are tensioned. The operation is similar to that of the device illustrated in FIG. 7. Further for reasons indicated in regard of FIG. 14, the rod 70 must have a length greater than the distance between the fixing points of the devices 31 and their associated cables on the boats.

As shown in FIG. 17, the coupling between the two boats 49a and 52a comprises, like the one in FIG. 14, two lateral telescopic rods acting as compressed inelastic connecting devices and which themselves comprise tubular elements 48 and 48a fixed to the boat 49a by swivel-joints 50 and 50a and inside which are displaceable, between stops 48b and 48c, parts 51 and 51a fixed to the boat 52a via swivel-joints 53 and 53a. The tensioned long-stroke resilient return and connecting device comprises two members 31 the attachment and guidance points 54 and 55 of which are at a shorter distance from each other than the distance separating the swivel-joints 50, 53 and 50a, 53a used to attach the telescopic rods.

During a curve toward starboard the telescopic rod 48a, 51a is compressed, the starboard device 31 and the port telescopic rod 48, 51 remain inoperative while the port device 31 is tensioned.

The embodiment shown in FIG. 18 is more particularly suited to trains called upon to travel in a homogeneous fluid, thus requiring that such trains shall be able to swivel in two planes at right angles to each other. The two elements 73 and 74 bear against each other over the whole of the area of their end faces and thus act as a compressed inelastic connecting device, the elements being held pressed together by a tensioned long-stroke resilient return and connecting device 31 positioned along the common longitudinal plane of symmetry of the two elements when the latter are aligned behind each other.

When negotiating a curve said device operates as the one illustrated in FIG. 5. The two elements 73 and 74 lean on each other by their edges disposed toward the center of curvature while the tension of device 31 increases.

Clearly, all the embodiments shown in FIGS. 1 to 17 and 21 can be adapted to suit the case of the train articulated in two planes by multiplying accordingly the number of compressed and tensioned devices, with and without long-stroke resilient return effect.

In the embodiment shown in FIG. 19, the successive boats 75a to 75c of the train, equipped with tensioned long-stroke resilient return and connecting devices 31, are associated in staggered relationship to lateral boats 76a to 76d which are themselves equipped with tensioned long-stroke resilient return devices 31. The train and lateral boats respectively act as compressed inelastic connecting devices for curvings directed toward starboard and port, as explained hereinafter, owing to their coupling via cables or chains 77.

When negotiating a curve toward starboard the boats 75a, 75b and 75c operate as the compressed starboard telescopic rod of FIG. 14 while all cables 77 are tensioned. The tension of port devices 31 increases and that of starboard devices 31 decreases.

The coupling shown in FIG. 20 differs from that in FIG. 19 in that the boats 78a to 78c of the train, which are equipped with their tensioned long-stroke resilient return and connecting devices 31, are associated in staggered relationship to lateral boats alongside them both to port and to starboard, these lateral boats 79, 79a, 80 and 80a being joined to the train boats by cables or chains 81. The boats 79, 80 and 79a, 80a respectively act as compressed inelastic connecting devices for curvings directed toward starboard and port.

During a curve directed toward starboard the boats 79a and 80a act as the compressed starboard telescopic rod of FIG. 14 while the tension of devices 31 increases. Boats 79 and 80 are driven by the cables 81 connecting them to boats 78a, 78b and 78c.

The couplings in FIGS. 19 and 20 are more particularly suited to articulated trains made up of short-length boats, such as canal lighters, which travel along rivers as trains, and floating containers capable of being withdrawn from the water for rapid unloading.

In all the embodiments described hereinabove, it is the tensioned connecting device which acts as a long-stroke resilient return device. In the layout shown in FIG. 21, the long-stroke resilient return action is assigned to the compressed connecting device. The two boats 82 and 83 are coupled together by means of two cables 84 and 84a acting as a tensioned inelastic connecting device. The compressed device is constituted by a pneumatic or hydropneumatic-buffer-type member comprising a cylinder 85 fixed by a swivel-joint 86 to the boat 82. Inside this cylinder is displaceable a piston 87 the rod 88 of which is fixed to the boat 83 via a swivel-joint 89. The chamber 90 of this cylinder which is opposite the rod 88 is filled with compressed air, or with some liquid such as oil, and communicates with a further chamber 91 containing an adjustable quantity of compressed air, the purpose being to pre-stress the compressed device and to be able to modify the working characteristics of the coupling to suit requirements. The buffer-type member acts as a compressed resilient connecting device.

The pressure of the compressed air is adjusted so as to keep the boats separate both when they are stopped and when they are travelling forwards or backwards.

During navigation when a swell is running, or when the train is being curved the boats 82 and 83 rotate with respect to each other around the ends of the cable 84 or 84a disposed toward the center of curvature. The point 89 comes nearer to point 86, the rod 88 thrusts the piston forward in the cylinder 85 and thus further compresses the air originally contained in the chamber 91 and also, where applicable, in the chamber 90. The other of the cables 84a or 84 becomes slack in the above configuration. The effect of compressing this air is to increase the compressive force tending to separate the boats from one another. Instead of using a pneumatic coupling in the layout illustrated by FIG. 22, a compression spring could be fittted in lieu thereof in the chamber 90.

The stroke of the resilient connecting device according to any one of the embodiments illustrated in FIGS. 1, 5 and 21 is caused to be sufficiently long and the restoring force which the latter exerts sufficiently weak to allow the train to be intentionally curved by operation of its steering device, or the boats of the train to be momentarily thrown out of alignment under the effect of a relatively great deviating force as a swell.

FIG. 22 represents a full articulated train adapted for navigation along sinuous waterways. Said train comprises a rear boat 92 provided with propulsive propellers 93 and 93a followed by rudders 94 and 94a, a plurality of intermediate boats 95, 96, and a leading boat 97 equipped with forward rudders 98a to 98c, all these boats being joined together by means of couplings according to any one of the embodiments disclosed hereinbefore, comprising both tensioned and compressed connecting devices of which either the former or the latter embody long-stroke resilient return action. In FIG. 22, the inelastic connecting devices consisting of the contacting ends of the boats are compressed while the tensioned resilient connecting device is constituted by devices 31.

The train is shown during a curving action carried out by means of the forward rudders 98a to 98c deviated in the same direction as the forward rudder of a single boat negotiating the same curve, while the rear rudders 94 and 94a are deviated in a reverse direction with respect to the rear rudder of a single boat negotiating the same curve. Consequently to the rear end of boat 92 and to the front end of boat 97 are respectively applied forces directed towards the center of curvature of the boat train and which balance the centrifugal forces acting on the boats of the train. The curving torque at the level of each coupling of the train is balanced out by the righting torque furnished by said coupling as soon as the desired angle is reached between the two successive boats which are interconnected by said coupling.

When the train is propelled in straight line, if deviating forces tend to misalign the boats between each other, the straight formation is maintained by acting in the usual manner on the front rudders 98a to 98c or on the rear rudders 94 and 94a.

The operation of said front and rear rudders is simultaneously effected from a piloting station which is preferably provided on the rear boat for a pushed train and on the front boat for a towed train of boats.

With a view to ensuring stability in the train, the compressed devices constituted by beams or connecting-rods of fixed or variable length are caused to be longer than the tensioned devices of the corresponding coupling, as already specified with reference to FIGS. 14 and 18.

It is to be noted that in the embodiments shown in FIGS. 2 and 3, the two boats may pivot only around two perpendicular axes, one of which is horizontal and transverse with respect to the boats for the displacements generated by the pitching and the other vertical and stationary for the displacements generated by a curving action. In all the other illustrated embodiments the two boats may pivot around three perpendicular axes, the first one horizontal and transverse with respect to the boats for the pitching displacements, the second one horizontal, longitudinal and movable for the rolling displacements and the third one vertical and movable for the curving displacements.

It is clearly obvious that, without departing from the scope of the invention as defined in the appended claims, many modifications, which may suggest themselves to the specialist in the art or as the result of practical experience, may be made to the embodiments disclosed. As an example, instead of using only one long-stroke resilient return member as a resilient connecting device, as in FIGS. 1 to 3, 5, 9, 19 and 12 to 15, two or more could be employed, arranged on either side of the longitudinal plane of symmetry of the boats aligned as per FIGS. 11 and 16. Similarly, instead of using a single compressed member as an inelastic connecting device, as shown in FIG. 16, two compressed members could be used, arranged one on each side of the longitudinal plane of symmetry of the aligned boats as per FIG. 14. In the same way, utilization of one of two tensioned or compressed long-stroke resilient return members for all the boats in the train, as shown in FIGS. 6 to 8, could be associated with utilization of compressed or tensioned devices of the type shown in FIGS. 14 to 16 and 19 to 21. When two members constitute the tensioned and compressed connecting devices, then, instead of being arranged parallel to the longitudinal plane of symmetry of the two aligned boats, they may be laid out obliquely in relation to this plane, thus forming a trapezium.

What we claim is:

1. A propelled train of boats comprising a plurality of articulated coupling means each of which interconnects two successive boats of the train and includes elastic means for generating by the resilient reaction thereof a righting torque between two successive boats misaligned under the action of a force, said righting torque having a variable magnitude which is a function of the degree of misalignment between said two successive boats and which is effective to automatically re-align said boats after the removal of said force, and two rudder assemblies respectively pivotably secured to the front end of the leading boat and to the rear end of the rear boat of the train, said train being advanceable along an arcuate path of determinable curvature with the rudder assemblies pivoted to assume positions in which the righting torque generated by each coupling means balances the moment applied to said coupling means by the pivoted rudder assemblies.

2. A propelled train of boats as claimed in claim 1 wherein each coupling means comprises two assemblies each of which includes at least one member and means for connecting the members of one assembly to successive boats of the train, said assemblies being respectively tensioned and compressed, one of said assemblies being inelastic, the other being resilient and initially pre-stressed to provide a sufficiently long stroke and a suitably weak resilient action to permit the train to be curved by operation of said rudder assemblies while permitting the boats to be momentarily misaligned under the action of relatively large deviating forces, each resilient assembly being effective to exert a force on associated boats to automatically restore the boats into alignment when the forces causing misalignment are removed, the resilient assembly being subjected to an initial pre-stressing force which exceeds the propulsive force tranmitted through the coupling between the respective boats.

3. A train according to claim 2, wherein with the inelastic assembly compressed, the distance between the attachment points of the tensioned resilient assembly is less than that between the attachment points of said compressed inelastic assembly.

4. A propelled train of boats with front and rear rudder assemblies, said train comprising a plurality of articulated coupling means each of which interconnects two successive boats of the train and comprises two assemblies each of which includes at least one member and means for connecting the members of one assembly to successive boats of the train, said assemblies being respectively tensioned and compressed, one of said assemblies being inelastic, the other being resilient and initially pre-stressed to provide a sufficiently long stroke and suitably weak resilient action to permit the train to be curved by operation of the rudder assemblies while permitting the boats to be momentarily misaligned under the action of relatively large deviating forces, each resilient assembly being effective to exert a force on associated boats to automatically restore the boats into alignment when the forces causing misalignment are removed, the resilient assembly being subjected to an initial pre-stressing force which exceeds the propulsive force transmitted through the coupling between the respective boats.

5. A train according to claim 4, wherein the assemblies of the connecting means are arranged symmetrically to the longitudinal plane of symmetry of the articulated train when the latter is in the aligned position.

6. A train according to claim 4 wherein the resilient assembly comprises a pre-stressed spring having a long-stroke and a small reactive force, means for securing one end of said spring on one of the boats, a deformable member connecting the other end of said spring with the other associated boat, and means fixed on the first boat for guiding said deformable member.

7. A train according to claim 4 wherein the resilient assembly comprises a chamber filled with a compressed fluid and universally pivoted on one of the boats, and a rigid member having one end which is universally pivoted on another boat and another end in said chamber and subjecting said fluid to compression when the two boats are misaligned.

8. A train according to claim 7, wherein the chamber and the rigid member are respectively constituted by a cylinder and a piston reciprocally mounted within said cylinder.

9. A train according to claim 7, further comprising a source of compressed fluid connected to the chamber in order to allow the fluid pressure in said chamber to be varied.

10. A train according to claim 4 wherein the inelastic assembly is adapted for being compressed and comprises a first cam integral with one of the boats, a second cam integral within an adjacent boat and in contacting engagement with the first cam under the influence of the resilient assembly and means for locking said cams between each other transversely with respect to the two boats.

11. A train according to claim 10 wherein the cams are constituted by facing end faces of the boats, and wherein the locking means comprises two vertical rollers of flexible material respectively interposed between vertical notches provided near the lateral edges of the two end faces and supported by one of the boats.

12. A train according to claim 10 wherein the cams are constituted by the facing end faces of the boats.

13. A train according to claim 4 wherein the inelastic assembly is adapted for being compressed and comprises facing end faces of the boats in contacting engagement, a vertical notch and tongue on the lateral edges of one of said end faces and a vertical tongue and notch on the latter edges of the other end faces and respectively engaging the notch and tongue of said one end face.

14. A train according to claim 4 wherein the inelastic assembly is adapted for being compressed and comprises a first cam integral with one of the boats and a second cam integral with the other boat and in contacting engagement with the first cam under the influence of the tensioned assembly.

15. A train according to claim 4 wherein the inelastic assembly is adapted for being compressed and comprises a first cam integral with one of the boats, a second cam integral with the other boat and urged towards the first cam under the influence of the resilient assembly and means in contacting engagement with both said cams for facilitating movement of said cams in a direction perpendicular to the plane in which the train is to be curved.

16. A train according to claim 15 wherein the cams are constituted by the facing end faces of the boats, respectively, and wherein the means for facilitating movement of said cams comprises a horizontal axle disposed between said end faces, flexible members interconnecting said axle and said boats, and rollers of flexible material mounted on said axle and in contacting engagement with said end faces.

17. A train according to claim 4 wherein the inelastic assembly is adapted for being tensioned and comprises at least one deformable member having ends which are respectively secured on two successive boats.

18. A train according to claim 4 wherein the inelastic assembly is adapted for being compressed and comprises at least one inelastic member and deformable members respectively interconnecting the ends of each inelastic member and two successive boats for universally pivoting said ends of said boats.

19. A train according to claim 18 wherein each rigid member is telescopic.

20. A train according to claim 4 wherein the inelastic assembly is adapted for being compressed and comprises at least one deformable member having ends which are respectively secured to two successive boats, the attachment point of each deformable member on the rear boat being forward of the attachment point of said member on the front boat.

21. A train according to claim 4 wherein the inelastic assembly is adapted for being compressed and comprises a line of boats laterally arranged on one side of the train in staggered relationship with the boats of the train, deformable members interconnecting each lateral boat and the two adjacent boats of the train, and wherein the resilient assembly is adapted for being tensioned and comprises long-stroke devices which interconnect on the one hand the successive boats of said line, and on the other hand the successive boats of the train.

22. A train according to claim 4 wherein the inelastic assembly is adapted for being compressed and comprises two lines of boats laterally arranged on either side of the train in staggered relationship with the boats of the train and deformable members interconnecting each lateral boat and the two adjacent boats of the train and wherein the resilient assembly is adapted for being tensioned and comprises resilient long-stroke devices interconnecting the successive boats of the train.

23. A train according to claim 4 wherein the elastic assembly is adapted for being tensioned and comprises a single resilient long-stroke connecting device for all the boats of the train placed on one of the end boats of the train in a longitudinal plane of symmetry of said end boat, a deformable member connecting said resilient long-stroke device with the other end boat of the train and means fixed on the successive boats of the train for guiding said deformable member.

24. A train according to claim 4 wherein the elastic assembly is adapted for being tensioned and comprises a single resilient long-stroke connecting device for all the boats of the train placed on one of the end boats of the train at right angles to the longitudinal plane of symmetry of said end boat, two deformable members parallel in aligned condition of the train and connecting the two ends of the said resilient long-stroke device to the other end boat of the train and means fixed on the successive boats of the train for guiding said deformable members.

25. A train according to claim 4 wherein the elastic assembly is adapted for being tensioned and comprises two resilient long-stroke connecting devices for all the boats of the train placed on one end boat of the train in planes parallel and symmetrically disposed with respect to the longitudinal plane of symmetry of said end boat, two deformable members parallel in aligned condition of the train and respectively connecting said resilient long-stroke devices with the other end boat of the train and means fixed on the successive boats of the train for guiding said deformable members.

References Cited in the file of this patent

UNITED STATES PATENTS

| | | |
|---|---|---|
| 1,529,036 | Richey | Mar. 10, 1925 |
| 1,559,816 | Ward | Nov. 3, 1925 |
| 2,055,369 | Warren | Sept. 22, 1936 |
| 2,684,653 | Dyer | July 27, 1954 |
| 2,831,673 | Paulsen | Apr. 22, 1958 |
| 2,879,884 | Joy | Mar. 31, 1959 |

FOREIGN PATENTS

| | | |
|---|---|---|
| 1,170,980 | France | Sept. 29, 1958 |
| 1,193,415 | France | Apr. 27, 1959 |
| 1,194,595 | France | May 11, 1959 |
| 566,149 | Belgium | Apr. 15, 1958 |